Sept. 13, 1949.  G. E. DATH  2,481,575
FRICTION SHOCK ABSORBING MECHANISM FOR
RAILWAY DRAFT RIGGINGS
Filed Oct. 23, 1947  2 Sheets-Sheet 1

Inventor:
George E. Dath
By Henry Fuchs
Atty.

Sept. 13, 1949.　　　　　G. E. DATH　　　　　2,481,575
FRICTION SHOCK ABSORBING MECHANISM FOR
RAILWAY DRAFT RIGGINGS
Filed Oct. 23, 1947　　　　　　　　　　　2 Sheets-Sheet 2
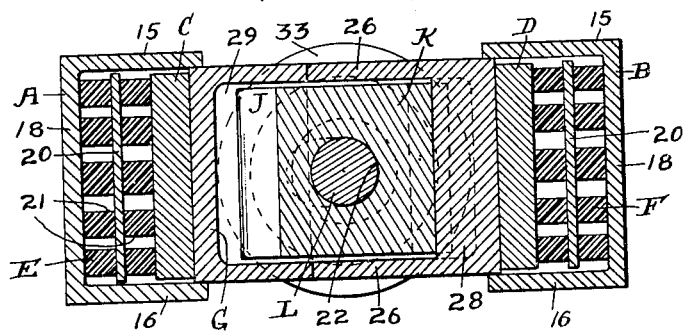
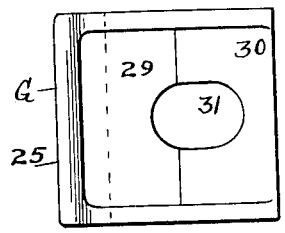 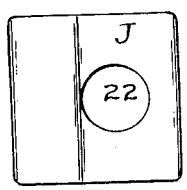 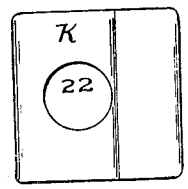
Inventor:
George E. Dath.
By Henry Fuchs.
Atty.

Patented Sept. 13, 1949

2,481,575

UNITED STATES PATENT OFFICE 2,481,575

FRICTION SHOCK ABSORBING MECHANISM FOR RAILWAY DRAFT RIGGINGS

George E. Dath, Mokena, Ill., assignor to W. H. Miner, Inc., Chicago, Ill., a corporation of Delaware Application October 23, 1947, Serial No. 781,717

6 Claims. (Cl. 213—22)

1

This invention relates to improvements in friction shock absorbing mechanisms especially adapted for railway draft riggings.

One object of the invention is to provide a friction shock absorbing mechanism, comprising end and follower members relatively movable toward and away from each other lengthwise of the mechanism, transversely separable spring resisted side wedges, and wedge means cooperating with said side wedges for forcing the same apart against the resistance of the spring means through relative movement of the followers toward each other, wherein the side wedges have sliding frictional engagement with the wedge means and end follower members to provide high frictional resistance.

A further object of the invention is to provide in a friction shock absorbing mechanism, as set forth in the preceding paragraph, additional means for cushioning the shocks to which the mechanism is subjected in the form of rubber mats or pads cooperating with the end followers.

Figure 1:
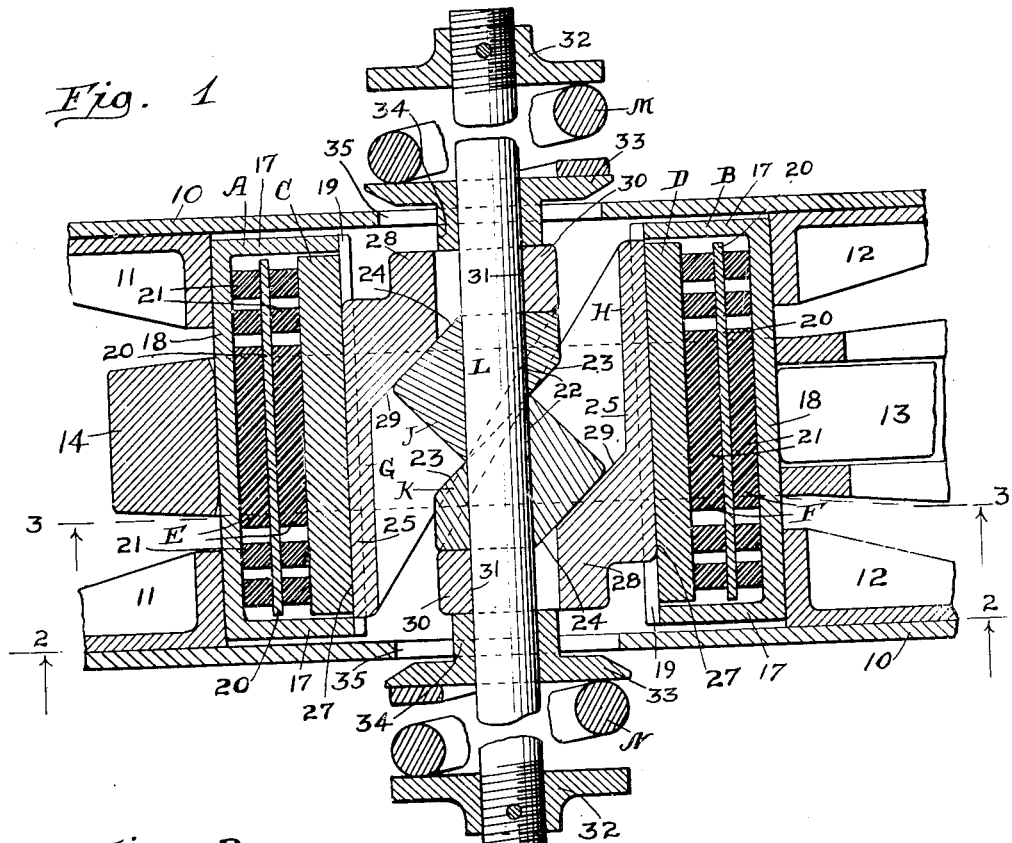
Figure 2:
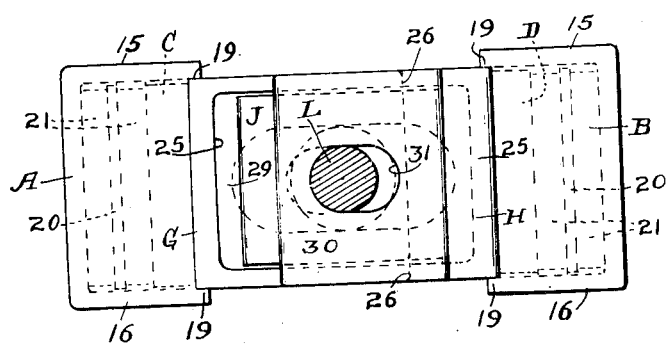

In the accompanying drawings forming a part of this specification, Figure 1 is a longitudinal, horizontal sectional view through the underframe structure of a railway car, illustrating my improved shock absorbing mechanism in connection therewith. Figure 2 is a longitudinal, vertical sectional view, corresponding substantially to the line 2—2 of Figure 1, with the yoke and draft sills omitted. Figure 3 is a longitudinal, vertical sectional view, corresponding substantially to the line 3—3 of Figure 1. Figures 4, 5, and 6 are elevational views, respectively, of one of the side wedges and the wedge blocks of my improved mechanism, Figure 4 showing the left hand side wedge illustrated in Figure 1, looking upwardly in said figure, Figure 5 showing the wedge block at the upper side in Figure 1, looking downwardly in said figure, and Figure 6 showing the wedge block at the lower side of Figure 1, looking upwardly in said figure. Figure 7 is an elevational view of the rubber cushioning element at the left hand side of Figure 3, looking toward the left in said figure.

In said drawings, 10—10 denote the center or draft sills of a railway car underframe to the inner sides of which are secured inner and outer stop lugs 11—11 and 12—12. The outer-end portion of the usual drawbar is indicated by 13, the same being operatively connected to my improved friction shock absorbing mechanism by a yoke 14 of well-known design.

As illustrated in the drawings, my improved 55

2 shock absorbing mechanism proper comprises broadly inner and outer end casings A and B, inner and outer followers C and D, inner and outer rubber cushioning elements E and F, side wedges G and H in frictional engagement with the followers, a pair of wedge blocks J and K in wedging engagement with the side wedges, a guide rod or bolt L, and side springs M and N.

The inner and outer end casings A and B are of similar design, each casing being in the form of a boxlike member open at its inner side and having vertically spaced, horizontal top and bottom walls 15 and 16, laterally spaced, vertical side walls 17—17, and a vertical transverse end wall 18. The end walls 18—18 of the casings A and B are engageable with the lugs 11—11 and 12—12, respectively, the casings A and B thus cooperating with these stop lugs in the manner of the usual end followers. The side walls 17—17 are shorter than the top and bottom walls 15 and 16, the casings thus presenting top and bottom guide flanges 19—19 and 19—19 at the open inner ends thereof.

The followers C and D are in the form of heavy, rectangular plates. These plates are of a size to slidingly fit within the casings A and B, the follower C being slidingly mounted in the casing A and the follower D being slidingly mounted in the casing B.

The rubber cushioning elements E and F are arranged within the casings A and B, respectively, the unit E being interposed between the end wall 18 of the casing A and the follower C, and the unit F being interposed between the end wall 18 of the casing B and the follower D. Each of the cushioning units E and F comprises a central metal backing plate 20 and rubber pads 21—21 at opposite sides of the plate vulcanized thereto. Each pad 21 is preferably made up of a central elongated block having rounded ends, a continuous band in the form of an oval loop surrounding the block and a second continuous band in the form of a loop surrounding the first named band. The pads 21—21 of each cushioning element bear respectively on the wall 18 and the follower of the corresponding casing and yieldingly resist relative approach of the follower and casing.

The supporting rod or bolt L is in the form of an elongated bar of circular cross section, threaded at opposite ends. This rod or bolt L is arranged transversely of the mechanism between the inner ends of the casings A and B and has its opposite ends extending outwardly beyond the sills 10—10.

The wedge blocks J and K are supported on the bolt or rod L at a point substantially midway between the opposite ends of the latter, the blocks being provided with transverse bores 22—22 to accommodate the bolt. The blocks J and K have contact with each other on their inner sides on diagonal flat faces 23—23. At the outer side thereof, each block presents a vertically extending, transversely inclined, flat wedge face 24, the wedge faces 24—24 of the two blocks facing in opposite directions, the face 24 of the block J being to the right, and that of the block K being to the left of the bolt L, as seen in Figure 1.

The side wedges G and H are of similar design, but reversely arranged end for end. Each side wedge comprises a vertically disposed, transversely extending, platelike section 25, and laterally projecting, top and bottom flanges or walls 26—26 extending from the section 25. Each side wedge thus presents a structure of channel formation. The outer side of the platelike section 25 of each side wedge presents a transversely extending, flat friction surface 27, which has sliding engagement with the corresponding follower C or D. Each side wedge G and H has a wedge projection 28 at one end thereof, extending inwardly from the plate section 25 between the top and bottom walls 26—26, the projection 28 of the side wedges G and H being respectively at opposite ends of the same. Each of the wedge projections 28 presents a laterally inclined wedge face 29 at its inner side.

As shown in Figure 1, the side wedges G and H are disposed at opposite sides of the wedge blocks J and K and are slidable transversely of the mechanism between the top and bottom flanges 19—19 and 19—19 of the end casings A and B, the side wedge G being at the left hand side of the blocks J and K, as seen in said figure, with the plate section 25 thereof in sliding engagement with the follower C and with the wedge face 29 thereof engaged with the wedge face 24 of the block J, and the side wedge H being at the right hand side of the wedge blocks J and K with the plate section 25 thereof in sliding engagement with the follower D, and with the wedge face 29 of the same engaged with the wedge face 24 of the block K. At the inner sides of the side wedges G and H, the top and bottom walls or flanges 26—26 are cut away on diagonal lines, as shown, to provide clearance for displacement of the side wedges toward each other in direction lengthwise of the mechanism.

The wedge projections 28—28 of the side wedges G and H are provided with extended lug portions 30—30, which are continuous with the wedge projections and, together with the latter, form end walls of said side wedges. The lugs 30—30 are slotted, as indicated at 31—31, to accommodate the bolt or rod L, which extends therethrough. The lugs 30—30 of the side wedges G and H directly overhang the outer ends of the wedge blocks J and K and, in the normal full release position of the mechanism shown in Figure 1, bear on these blocks.

The springs M and N, which are in the form of heavy helical coils, are carried on opposite ends of the bar or rod L, outwardly of the side sills 10—10 of the car. The springs M and N surround the bar L and are held in position on the rod by fixed follower plates in the form of nuts 32—32 threaded on the outer ends of the bar or rod. A movable follower disc 33, which is slidable on the rod L, is interposed between the inner end of each spring and the corresponding side wedge. Each disc 33 is preferably formed with a cylindrical bosslike collar 34 on its inner side, which surrounds the bar L and extends through the slot 35 of the corresponding sill 10 into bearing engagement with the side wedge at the corresponding side of the mechanism.

In the operation of my improved mechanism, the parts are compressed between the casings A and B, the casing A being pulled toward the right by the yoke 14 in draft, as viewed in Figure 1, toward the casing B, which is held stationary by the outer stops 12—12, and the casing B being forced inwardly toward the left by the drawbar 13 in buff, toward the casing A, which is held stationary by the inner stop lugs 11—11. During this relative movement of the casings A and B toward each other, the rubber cushioning elements E and F are compressed against the followers C and D, forcing the latter and the side wedges G and H, which are engaged with the followers, relatively toward each other lengthwise of the mechanism. As the side wedges approach each other, lengthwise of the mechanism, they are forced apart laterally by the wedging action of the wedge blocks J and K, compressing the springs M and N. During this action, relatively high frictional resistance, in addition to the cushioning effect of the rubber elements, is produced by lateral sliding movement of the spring resisted side wedges on the followers C and D and also by sliding movement of the wedge faces of the side wedges on the wedge faces of the wedge blocks J and K.

I claim:

1. In a shock absorbing mechanism, the combination with a pair of follower plates relatively movable toward each other lengthwise of the mechanism; of a central, transversely extending guide bar between said follower plates; wedge means supported on said guide bar, said wedge means extending lengthwise of the bar and held thereby against movement with respect to the same in direction lengthwise of the mechanism, said wedge means having wedge faces at opposite ends thereof; laterally separable side wedges having wedge faces respectively in wedging engagement with said wedge faces of the wedge means, said side wedges being supported for sliding movement on said guide bar lengthwise of the same, each of said side wedges having a friction plate section thereon integral therewith extending laterally inwardly therefrom and in sliding engagement with one of said follower plates; and springs at opposite sides of the mechanism supported on said guide bar and yieldingly opposing lateral separation of said side wedges.

2. In a shock absorbing mechanism, the combination with a pair of follower plates relatively movable toward and away from each other lengthwise of the mechanism; of a transversely extending guide bar between said follower plates; a pair of combined wedge and friction members at opposite sides of the mechanism slidingly supported on said bar for movement lengthwise thereof, each of said combined members having a friction surface extending transversely of the mechanism and slidingly engaging the corresponding follower plate, each of said combined members having a laterally inwardly facing wedge face, the wedge faces of said combined members being respectively at opposite sides of the mechanism; a pair of laterally abutting wedge blocks on said guide bar and held thereby against movement with respect thereto in a direction lengthwise of the mechanism, said wedge blocks being embraced between the wedge faces of said combined members and having wedge faces in sliding wedging engagement with the faces of said combined members; springs at opposite sides of the mechanism supported on said guide bar, each of said springs bearing at one end on the corresponding combined member; and fixed spring abutments on the outer ends of said guide bar bearing on the outer ends of said springs.

3. In a shock absorbing mechanism, the combination with a pair of shock absorbing units at opposite ends of the mechanism movable lengthwise of the mechanism toward and away from each other, each unit including an inner and an outer follower movable toward each other, and an interposed rubber cushioning element yieldingly resisting relative approach of said inner and outer followers, said inner followers of said pair of said shock absorbing units having friction surfaces on their inner sides extending transversely of the mechanism; of a pair of laterally separable side wedges, each side wedge having a laterally inwardly extending friction post rigid therewith, said friction posts of the side wedges of said pair having sliding engagement respectively with the friction surfaces of said inner followers; a central wedge means between said side wedges, one of said side wedges having a wedge portion at one side of the mechanism overhanging said wedge means, and the other of said side wedges having a wedge portion at the other side of the mechanism overhanging said wedge means, said wedge portions of said side wedges being in wedging engagement with said wedge means; and springs at opposite sides of the mechanism yieldingly opposing lateral outward movement of said side wedges away from each other.

4. In a shock absorbing mechanism, the combination with a pair of follower casings at opposite ends of the mechanism closed at their outer ends and open at their inner ends, said casings being relatively movable toward and away from each other lengthwise of the mechanism; of a follower plate at the open end of each casing; a rubber cushioning unit within each casing bearing at opposite ends on said closed end of the casing and the corresponding follower plate, respectively; laterally separable side wedges having sliding frictional engagement with the follower plates, respectively; a central wedge means between said side wedges, said side wedges and wedge means having cooperating wedge faces for wedging said side wedges laterally apart upon relative approach of said side wedges lengthwise of the mechanism; and springs at opposite sides of the mechanism yieldingly opposing lateral separation of said side wedges.

5. In a shock absorbing mechanism, the combination with a pair of follower casings at opposite ends of the mechanism movable toward and away from each other lengthwise of the mechanism, each of said casings being closed by a transverse wall at its outer end; of a cushioning unit within each casing bearing at its outer end on the transverse wall thereof; a transversely disposed follower plate bearing on the inner end of each cushioning unit, said plates being relatively movable toward and away from each other lengthwise of the mechanism, said follower plates having transversely extending friction surfaces on the inner sides thereof; laterally separable side wedges, each of said side wedges having a laterally inwardly extending friction post rigid therewith in sliding engagement with the friction surface of one of said followers; central wedge means in wedging engagement with said side wedges to force the same laterally apart; and spring means at opposite sides of the mechanism yieldingly opposing lateral separation of said side wedges.

6. In a shock absorbing mechanism, the combination with follower casings at opposite ends of the mechanism movable toward and away from each other lengthwise of the mechanism, each casing being open at its inner end and closed at its outer end; of a cushioning unit within each casing bearing at its outer end on the closed end of said casing; a transversely disposed follower plate bearing on the inner end of each cushioning unit, said plates being relatively movable toward and away from each other lengthwise of the mechanism; a central, transversely extending guide bar between said follower plates; a central wedge means carried by said guide bar and held against movement with respect to the same in direction lengthwise of the mechanism, said wedge means extending lengthwise of said bar and having wedge faces at opposite ends; combined wedge and friction members slidable on said bar, said combined members having wedge faces overhanging and engaging with the wedge faces of said wedge means, said combined wedge and friction members having sliding frictional engagement laterally of the mechanism on the inner sides of said follower plates, respectively; and springs at opposite sides of the mechanism supported on said guide bar and yieldingly opposing lateral separation of said combined side wedge and friction members.

GEORGE E. DATH.

REFERENCES CITED

The following references are of record in the file of this patent:

UNITED STATES PATENTS

| Number | Name | Date |
| --- | --- | --- |
| 1,921,046 | Sproul | Aug. 8, 1933 |
| 2,233,348 | Light | Feb. 25, 1941 |